(12) United States Patent
Aoyama et al.

(10) Patent No.: US 7,579,057 B2
(45) Date of Patent: *Aug. 25, 2009

(54) RESIN MOLDING AND WORKED ITEM THEREFROM

(75) Inventors: Teruo Aoyama, Mie (JP); Minoru Furuichi, Mie (JP)

(73) Assignee: JSR Corporation, Tokyo (JP)

( * ) Notice: Subject to any disclaimer, the term of this patent is extended or adjusted under 35 U.S.C. 154(b) by 356 days.

This patent is subject to a terminal disclaimer.

(21) Appl. No.: 10/529,206

(22) PCT Filed: Mar. 23, 2004

(86) PCT No.: PCT/JP2004/003964

§ 371 (c)(1),
(2), (4) Date: Mar. 25, 2005

(87) PCT Pub. No.: WO2004/085523

PCT Pub. Date: Oct. 7, 2004

(65) Prior Publication Data

US 2006/0068202 A1     Mar. 30, 2006

(30) Foreign Application Priority Data

Mar. 27, 2003   (JP) ............................. 2003-086775

(51) Int. Cl.
*C08L 25/00* (2006.01)
*C08J 3/28* (2006.01)
*A61M 39/00* (2006.01)

(52) U.S. Cl. ..................... 428/36.8; 428/36.9; 526/335; 522/158

(58) Field of Classification Search .................. 522/158, 522/112, 110; 526/335; 428/36.8, 36.9
See application file for complete search history.

(56) References Cited

U.S. PATENT DOCUMENTS

| | | | | | |
|---|---|---|---|---|---|
| 4,324,866 | A | * | 4/1982 | Furuichi et al. | 521/140 |
| 4,465,487 | A | * | 8/1984 | Nakamura et al. | 604/408 |
| 5,063,005 | A | * | 11/1991 | Doheny, Jr. | 264/471 |
| 6,187,400 | B1 | * | 2/2001 | Woo et al. | 428/36.6 |
| 6,956,093 | B1 | * | 10/2005 | Hsu et al. | 526/335 |
| 7,011,872 | B2 | * | 3/2006 | Ding et al. | 428/35.7 |
| 2004/0206362 | A1 | * | 10/2004 | Furuichi et al. | 128/897 |

FOREIGN PATENT DOCUMENTS

| | | | |
|---|---|---|---|
| EP | 0825227 A1 | * | 2/1998 |
| JP | 7-179675 | | 7/1995 |

* cited by examiner

*Primary Examiner*—Susan W Berman
(74) *Attorney, Agent, or Firm*—Oblon, Spivak, McClelland, Maier & Neustadt, P.C.

(57) ABSTRACT

A resin molded article which is a molded article obtained by irradiating a resin molded article containing 100 to 60 parts by weight of (A) syndiotactic 1,2-polybutadiene having a crystallinity of 5% or more and 0 to 40 parts by weight of (B) another thermoplastic polymer with an electron beam, in which the 50% stress of the molded article after the electron beam irradiation (50% M:M2) is from 1.01 to 2.5 times the 50% stress before the electron beam irradiation (50% M:M1), and the molded article has steam sterilization resistance. The molded article is excellent in flexibility and hardness, excellent in steam sterilization resistance, and useful for medical applications such as an infusion tube, an infusion solution container, a catheter and the like.

13 Claims, No Drawings

RESIN MOLDING AND WORKED ITEM THEREFROM

TECHNICAL FIELD

The present invention relates to a molded article obtained by irradiating a resin molded article comprising a syndiotactic 1,2-polybutadiene-containing composition with an electron beam. More particularly, the invention relates to a syndiotactic 1,2-polybutadiene-containing molded article which is excellent in flexibility and hardness and has steam sterilization resistance.

BACKGROUND ART

Syndiotactic 1,2-polybutadiene is a thermoplastic elastomer having both the property of plastic (hardness) and the properties of rubber (elasticity and flexibility), and can be easily molded by use of a general-purpose polymer processing machine, while having a definite crystallinity. Accordingly, it has come to be used in various industrial goods.

In particular, it is excellent in gas permeability resistance and transparency, can be shaped without the addition of plasticizers, compared to vinyl chloride-based resins requiring a large amount of plasticizers, and has moderate flexibility and self-adhesion. Accordingly, the application thereof to medical instruments such as an infusion tube and a catheter is expanding.

However, syndiotactic 1,2-polybutadiene has a melt-starting temperature as low as 70 to 95° C., when low in crystallinity. When this is used in a medical instrument such as an infusion tube, an infusion solution container or a catheter, and sterilized by steam, a problem has been practically encountered because of its poor heat resistance in some cases.

As a method for improving the balance in performance, while keeping the characteristics of syndiotactic 1,2-polybutadiene that it is a thermoplastic elastomer having both the property of plastic (hardness) and the properties of rubber (elasticity and flexibility), there has been proposed a method of crosslinking only a surface of a molded article by irradiating it with an ultraviolet ray having a specific wavelength, thereby curing it (Japanese Patent Laid-Open Publication 2000-129017). This method exhibits a reasonable effect in respect to improvement of the balance in performance among flexibility, transparency and heat resistance (high-pressure steam sterilization resistance).

Further, in order to obtain a harder surface, electron beam irradiation methods have also been variously proposed. These methods exhibit a certain effect for scratch resistance.

However, in the molded article obtained by the method described in the above-mentioned specification, only the surface layer is crosslinked by the irradiation of the ultraviolet ray having a wavelength within the specific range. Accordingly, for example, the heat resistance of the inside of a medical tube is not necessarily fully satisfactory. Further, according to the conventional methods using electron beams, the inside of the molded article is also hardened in excess, which poses the problem that flexibility, one property of syndiotactic 1,2-polybutadiene, is almost lost.

It is therefore an object of the present invention to provide a syndiotactic 1,2-polybutadiene-containing molded article which is useful for medical applications and the like, such as an infusion tube, an infusion solution container, a catheter and the like, excellent in flexibility and hardness, and also excellent in steam sterilization resistance.

DISCLOSURE OF THE INVENTION

The present invention relates to a resin molded article characterized in that the resin molded article is a molded article obtained by irradiating a resin molded article containing 100 to 60 parts by weight of (A) syndiotactic 1,2-polybutadiene having a crystallinity of 5% or more and 0 to 40 parts by weight of (B) at least one thermoplastic polymer selected from the group of polypropylene, a styrene-butadiene-styrene block copolymer (SBS), a styreneisoprene-styrene block copolymer (SIS), a hydrogenated thereof (SEBS or SEPS), polybutadiene (BR) other than the above-mentioned syndiotactic 1,2-polybutadiene, an ABS resin, polyisoprene, polyethylene (LLDPE, ULDPE or LDPE), an ethylene-vinyl acetate copolymer, an ethylene-acrylate ester copolymer and an ethylene-methacrylate copolymer [with the proviso that (A)+(B)=100 parts by weight), with an electron beam, in which the 50% stress of the molded article after the electron beam irradiation (50% M: M2) is from 1.01 to 2.5 times of the 50% stress before the electron beam irradiation (50% M: M1), and the molded article has steam sterilization resistance.

Here, it is preferred that the resin molded article has a haze value of 50 or less to have transparency.

Further, the toluene insoluble matter of the resin formed article after the electron beam irradiation is usually from 50 to 99% by weight.

Furthermore, as for electron beam dose, the product of electron beam acceleration voltage (kV) and irradiation dose (Mrad) is from 2 to 1,000,000 (kV·Mrad).

Specific examples of the resin molded articles include at least one selected from the group of a tube, a sheet, a film, a bag and a connector.

It is preferred that these resin molded articles have a halogen atom content of 50 ppm or less.

The resin molded article of the present invention is applied particularly for medical applications.

Further, the present invention relates to a processed product for food applications, footwear applications, vehicle applications, wire covering applications or the like.

BEST MODE FOR CARRYING OUT THE INVENTION (A) Syndiotactic 1,2-Polybutadiene (A) The syndiotactic 1,2-polybutadiene used in the present invention is a syndiotactic 1,2-polybutadiene having a crystallinity of 5% or more, preferably 10 to 40%, and the melting point thereof is preferably within the range of 50 to 130° C., and more preferably within the range of 60 to 120° C. The crystallinity and melting point within these ranges result in excellent mechanical strength such as tensile strength or tear strength, and excellent flexibility.

(A) The syndiotactic 1,2-polybutadiene used in the present invention is, for example, one having a 1,2-bond content of 70% or more, and obtained, for example, by polymerizing butadiene in the presence of a catalyst containing a cobalt compound and an aluminoxane. However, the production method should not be construed as being limited thereto.

The 1,2-bond content in butadiene bond units of (A) the syndiotactic 1,2-polybutadiene used in the present invention is usually 70% or more, preferably 80% or more, and more preferably 90% or more. When the 1,2-bond content is 70% or more, the 1,2-polybutadiene exhibits properties as a good thermoplastic elastomer.

(A) The syndiotactic 1,2-polybutadiene used in the present invention may be copolymerized with a small amount of a conjugated diene other than butadiene. The conjugated dienes other than butadiene include 1,3-pentadiene, a higher alkyl group-substituted 1,3-butadiene derivative, a 2-alkyl-substituted 1,3-butadiene and the like. Of these, the higher alkyl group-substituted 1,3-butadiene derivatives include 1-pentyl-1,3-butadiene, 1-hexyl-1,3-butadiene, 1-heptyl-1,3-butadiene, 1-octyl-1,3-butadiene and the like.

Here, typical examples of the 2-alkyl-substituted 1,3-butadienes include 2-methyl-1,3-butadiene (isoprene), 2-ethyl-1,3-butadiene, 2-propyl-1,3-butadiene, 2-isopropyl-1,3-butadiene, 2-butyl-1,3-butadiene, 2-isobutyl-1,3-butadiene, 2-amyl-1,3-butadiene, 2-isoamyl-1,3-butadiene, 2-hexyl-1,3-butadiene, 2-cyclohexyl-1,3-butadiene, 2-iso-hexyl-1,3-butadiene, 2-heptyl-1,3-butadiene, 2-isoheptyl-1,3-butadiene, 2-octyl-1,3-butadiene, 2-isooctyl-1,3-butadiene and the like. Of these conjugated dienes, preferred examples of the conjugated dienes to be copolymerized with butadiene include isoprene and 1,3-pentadiene. The content of butadiene in monomer components subjected to polymerization is preferably 50 mol % or more, and particularly 70 mol % or more.

As described above, (A) the syndiotactic 1,2-poly-butadiene used in the present invention is obtained, for example, by polymerizing butadiene in the presence of the catalyst containing the cobalt compound and the aluminoxane. The above-mentioned cobalt compounds preferably include an organic acid salt of cobalt having 4 or more carbon atoms. Specific examples of the organic acid salts of cobalt include a butyrate; a hexanoate; a heptylate; an octylate such as 2-ethylhexylic acid; a decanoate; a higher fatty acid salt such as stearic acid, oleic acid or erucic acid; a benzoate; an alkyl-, aralkyl- or allyl-substituted benzoate such as a tolylate, a xylylate or an ethylbenzoic acid; a naphthoate; and an alkyl-, aralkyl- or allyl-substituted naphthoate. Of these, a so-called octylate or a salt of 2-ethylhexylic acid, a stearate and a benzoate are preferred for excellent solubility in a hydrocarbon solvent.

The above-mentioned aluminoxanes include, for example, one represented by the following general formula (I) or general formula (II):

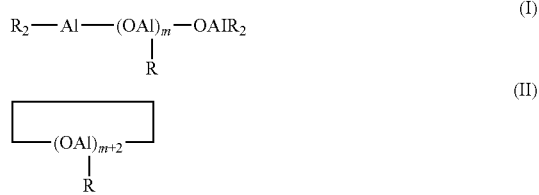

In the aluminoxane represented by general formula (I) or (II), R is a hydrocarbon group such as a methyl group, an ethyl group, a propyl group or a butyl group, preferably a methyl group or an ethyl group, and particularly preferably a methyl group.

Further, m is an integer of 2 or more, preferably an integer of 5 or more, and more preferably an integer of 10 to 100. Specific examples of the aluminoxanes include methyl-aluminoxane, ethylaluminoxane, propylaluminoxane, butyl-aluminoxane and the like, and methylaluminoxane is particularly preferred.

It is very preferred that the polymerization catalyst contains a phosphine compound, in addition to the above-mentioned cobalt compound and aminoxane. The phosphine compound is a component effective for activation of the polymerization catalyst, and the control of the vinyl bond structure and crystallinity. It preferably includes an organic phosphorus compound represented by the following general formula (III):

$$P(Ar)_n(R')_{3-n} \quad (III)$$

In general formula (III), Ar represents a group shown below:

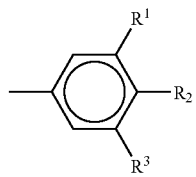

(In the above-mentioned group, $R^1$, $R^2$ and $R^3$, which may be the same or different, each represent a hydrogen atom, an alkyl group preferably having 1 to 6 carbon atoms, a halogen atom, an alkoxyl group preferably having 1 to 6 carbon atoms or an aryl group preferably having 6 to 12 carbon atoms.)

Further, in general formula (III), R' represents a cycloalkyl group or an alkyl-substituted cycloalkyl group, and n is an integer of 0 to 3.

Specifically, the phosphine compounds represented by general formula (III) include tri(3-methylphenyl)phosphine, tri(3-ethylphenyl)phosphine, tri(3,5-dimethylphenyl)phosphine, tri(3,4-dimethylphenyl)phosphine, tri(3-isopropylphenyl)phosphine, tri(3-t-butylphenyl)phosphine, tri(3,5-diethylphenyl)phosphine, tri(3-methyl-5-ethylphenyl) phosphine, tri(3-phenylphenyl)phosphine, tri(3,4,5-trimethylphenyl)phosphine, tri(4-methoxy-3,5-dimethylphenyl)phosphine, tri(4-ethoxy-3,5-diethylphenyl) phosphine, tri(4-butoxy-3,5-dibutylphenyl)phosphine, tri(p-methoxyphenyl)phosphine, tricyclohexylphosphine, dicyclohexylphenylphosphine, tribenzylphosphine, tri(4-methylphenylphosphine), tri(4-ethylphenylphosphine) and the like. Of these, particularly preferred ones include triphenylphosphine, tri(3-methylphenyl)phosphine, tri(4-methoxy-3,5-dimethylphenyl)phosphine and the like.

Further, as the cobalt compound, there can be used a compound represented by the following general formula (IV):

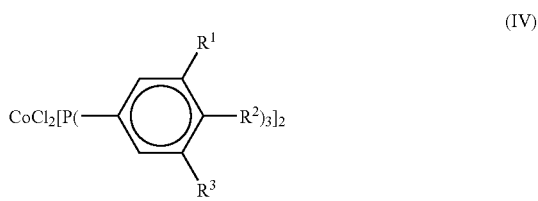

The compound represented by the above-mentioned general formula (IV) is a complex having a phosphine compound in which n is 3 in the above-mentioned general formula (III), as a ligand to cobalt chloride. When this cobalt compound is used, one previously synthesized may be used, or a method of contacting cobalt chloride with the phosphine compound in a polymerization system may be used. The amount of 1,2-vinyl bonds and crystallinity of the resulting syndiotactic 1,2-polybutadiene can be controlled by variously selecting the phosphine compound in the complex.

Specific examples of the cobalt compound represented by the above-mentioned general formula (IV) include cobalt bis(triphenylphosphine)dichloride, cobalt bis[tris(3-methylphenylphosphine)]dichloride, cobalt bis[tris(3-ethylphenylphosphine)]dichloride, cobalt bis[tris(4-methylphenylphosphine)]dichloride, cobalt bis[tris(3,5-dimethylphenylphosphine)]dichloride, cobalt bis[tris(3,4-dimethylphenylphosphine)]dichloride, cobalt bis[tris(3-isopropylphenylphosphine)]dichloride, cobalt bis[tris(3-t-butylphenylphosphine)]dichloride, cobalt bis[tris(3,5-diethylphenylphosphine)]dichloride, cobalt bis[tris(3-methyl-5-ethylphenylphosphine)]dichloride, cobalt bis [tris (3-phenylphenylphosphine)]dichloride, cobalt bis[tris(3,4,5-trimethylphenylphosphine)]dichloride, cobalt bis[tris(4-methoxy-3,5-dimethylphenylphosphine)]dichloride, cobalt bis [tris (4-ethoxy-3,5-diethylphenylphosphine)]dichloride, cobalt bis[tris(4-butoxy-3,5-dibutylphenylphosphine)]dichloride, cobalt bis[tris(4-methoxyphenylphosphine)]dichloride, cobalt bis(tris(3-methoxyphenylphosphine)]dichloride, cobalt bis[tris(4-dodecylphenylphosphine)]dichloride, cobalt bis[tris(4-ethylphenylphosphine)]dichloride and the like.

Of these, particularly preferred ones include cobalt bis(triphenylphosphine)dichloride, cobalt bis[tris(3-methylphenylphosphine)]dichloride, cobalt bis[tris(3,5-dimethylphenylphosphine)]dichloride, cobalt bis[tris(4-methoxy-3,5-dimethylphenylphosphine)]dichloride and the like.

As the amount of the catalyst used, the cobalt compound is used in an amount of 0.001 to 1 mmol, preferably about 0.01 to about 0.5 mmol, in terms of a cobalt atom per mole of butadiene for homopolymerization, and per mole of the total amount of butadiene and a conjugated diene other than butadiene for copolymerization. Further, the amount of the phosphine compound used is usually from 0.1 to 50, preferably from 0.5 to 20, and more preferably from 1 to 20, as the atomic ratio of phosphorus to cobalt (P/Co). Furthermore, the amount of the aluminoxane used is usually from 4 to $10^7$, and preferably from 10 to $10^6$, as the atomic ratio of aluminum to cobalt of the cobalt compound (Al/Co). When the complex represented by general formula (IV) is used, the amount of the phosphine compound used is 2 as the atomic ratio of phosphorus to cobalt (P/Co), and the amount of the aluminoxane used follows the above description.

Inert organic solvents used as polymerization solvents include, for example, aromatic hydrocarbon solvents such as benzene, toluene, xylene and cumene, aliphatic hydrocarbon solvents such as n-pentane, n-hexane and n-butane, alicyclic hydrocarbon solvents such as cyclopentane, methylcyclopentane and cyclohexane, and mixtures thereof.

The polymerization temperature is usually from −50 to 120° C., and preferably from −20 to 100° C.

The polymerization reaction may be either batch-wise or continuous. The monomer concentration in the solvent is usually from 5 to 50% by weight, and preferably from 10 to 35% by weight.

Further, for producing the polymer, it is necessary to take into consideration that contamination with a compound having an inactivating function such as oxygen, water or carbon dioxide in a polymerization system should be decreased to the utmost, in order not to inactivate the catalyst and polymer of the invention. When the polymerization reaction proceeds to a desired stage, an alcohol, another polymerization terminator, an antiaging agent, an antioxidant, an ultraviolet absorber and the like are added to the reaction mixture, and then, the obtained polymer is separated, washed and dried according to the conventional methods. Thus, the syndiotactic 1,2-polybutadiene used in the present invention can be obtained.

The weight average molecular weight of (A) the syndiotactic 1,2-polybutadiene used in the present invention is preferably from 10,000 to 5,000,000, more preferably from 10,000 to 1,500,000, and particularly preferably from 50,000 to 1,000,000. When the weight average molecular weight is less than 10,000, fluidity is extremely high, which unfavorably makes processing very difficult and provides a sticky article. On the other hand, exceeding 5,000,000 results in extremely low fluidity, which unfavorably makes processing very difficult.

(B) Thermoplastic Polymer (B) The thermoplastic polymer is a thermoplastic resin and/or thermoplastic elastomer other than the above-mentioned component (A), and specifically, at least one selected from the group of polypropylene, a styrene-butadiene-styrene block copolymer (SBS), a styrene-isoprene-styrene block copolymer (SIS), a hydrogenated thereof (SEBS or SEPS), polybutadiene (BR) other than the above-mentioned syndiotactic 1,2-polybutadiene, an ABS resin, polyisoprene, various polyethylenes (LLDPE, ULDPE or LDPE), an ethylene-vinyl acetate copolymer, an ethylene-acrylate ester copolymer and an ethylene-methacrylate copolymer.

The amount of component (B) blended is 40 parts by weight or less, and preferably from 0 to 35 parts by weight, based on 100 parts by weight of the total amount of components (A) and (B). Exceeding 40 parts by weight results in a decrease in the ratio of component (A) used. As a result, flexibility, hardness and transparency are lost.

Further, the composition used in the present invention may contain an additive such as a lubricant, a filler, an oil, a foaming agent or the like, in addition to the above-mentioned components (A) and (B), as needed. Specific examples of the above-mentioned additives include a lubricant such as erucic acid amide, stearic acid amide or oleic acid amide, a filler such as talc, silica, magnesium hydroxide, calcium carbonate, glass, carbon fiber or glass balloons, and a foaming agent such as paraffin oil, silicone oil, an Expancel foaming agent (bead type foaming agent microspheres commercially available from Nihon Fillite Co., Ltd.; beads expand 40 times or more when subjected to forming processing), ADCA (azodicarbonamide), OBSH (p,p'-oxybisbenzenesulfonylhydrazine), sodium bicarbonate, AIBN (azobisisobutyronitrile) or the like.

Further, in order to improve heat resistance and flexibility by electron beam irradiation, another additive, for example, a multifunctional monomer such as trimethyl propane trimethacrylate, a photopolymerization initiator such as hydroxycyclohexyl phenyl ketone, a photosensitizer such as benzophenone or the like may be added in an amount of 5 parts by weight or less based on 100 parts by weight of the syndiotactic 1,2-polybutadiene.

Preparation and Molding of Composition

The composition used in the present invention, which is the above-mentioned components (A) and (B) or a composition further containing the above-mentioned additive(s) or the like added thereto as needed, is softened by heating, kneaded and molded. Kneading and molding are conducted within the temperature range equal to or higher than the softening temperature or melting temperature of the syndiotactic 1,2-polybutadiene, in which moldability is good, thereby providing a homogeneous molded article.

Accordingly, the molding temperature is preferably from about 90 to about 170° C. In order to obtain the molded article, there is utilized press molding, extrusion molding, injection molding, blow molding, profile extrusion molding, T-die film molding, inflation molding, powder slush molding, rotational molding or the like.

Electron Beam Irradiation

The resin molded article of the present invention is obtained by subsequent electron beam irradiation. The electron beam irradiation molds a three-dimensional crosslinked structure by radical reaction of a vinyl group of the syndiotactic 1,2-polybutadiene to cure the molded article and give heat resistance.

An electron beam has permeability to a synthetic resin, and the degree of its permeation depends on the thickness of a molded article and kinetic energy of the electron beam.

When energy of the electron beam is controlled so as to be uniformly permeable in the thickness direction according to irradiation thickness, the molded article whose degree of crosslinking is homogenized in the thickness direction can be obtained.

The energy of the electron beam is preferably from 20 to 5,000 kV, more preferably from 50 to 3,000 kV, and still more preferably from 100 to 2,000 kV, to the above-mentioned molded article. Less than 20 kV results in a relative increase in the ratio of electrons captured and absorbed by a surface layer to decrease the electron beam which permeates through the molded article. Accordingly, the inside thereof is crosslinked late compared to the surface layer, which unfavorably causes the inhomogeneous degree of crosslinking. On the other hand, exceeding 5,000 kV results in too high a degree of crosslinking, thereby making the molded article hard, which unfavorably causes low elasticity and elongation.

Further, the dose of the electron beam in this case is preferably from 0.1 to 200 Mrad (corresponding to 1 to 2,000 kGy in the SI unit system), and more preferably from 0.5 to 100 Mrad. The molded article is irradiated with the electron beam within this dose range to perform curing by crosslinking. Less than 0.1 Mrad results in a decrease in the degree of crosslinking of 1,2-polybutadiene, whereas exceeding 200 Mrad results in too high a degree of crosslinking, thereby making the molded article hard, which unfavorably causes low elasticity and elongation.

The degree of crosslinking by electron beam irradiation can be expressed by the product of electron beam energy and dose. In the present invention, the product of electron beam acceleration voltage (kV) and irradiation dose (Mrad) is preferably from 2 to 1,000,000 (kV·Mrad), more preferably from 25 to 300,000 (kV·Mrad), and still more preferably from 50 to 100,000 (kV·Mrad). Less than 2 (kV·Mrad) results in a relative increase in the ratio of electrons captured and absorbed by a surface layer to decrease the electron beam which permeates through the molded article. Accordingly, the inside thereof is crosslinked late compared to the surface layer, which unfavorably causes the inhomogeneous degree of crosslinking. On the other hand, exceeding 1,000,000 (kV·Mrad) results in too high a degree of crosslinking, thereby making the molded article hard, which unfavorably causes low elasticity and elongation.

The M2/M1 ratio can be increased to preferably 1.01 to 2.5 times, more preferably 1.02 to 2.0 times by applying the electron beam irradiation described above to the molded article of the present invention. The M2 and M1 as used herein mean the 50% stress of the molded article after the electron beam irradiation (50% M:M2) and the 50% stress of the molded article before the electron beam irradiation (50% M:M1), respectively. Less than 1.01 results in no proceeding of the electron beam crosslinking to cause poor steam sterilization resistance. On the other hand, exceeding 2.5 results in too hard a crosslinked molded article, unfavorably leads to the loss of flexibility. The M2/M1 can be easily controlled by adjusting the above-mentioned product of electron beam acceleration voltage (kV) and irradiation dose (Mrad), preferably to 2 to 1,000,000 (kV·Mrad), more preferably to 25 to 300,000 (kV·Mrad) and still more preferably to 50 to 100,000 (kV·Mrad).

The thus-obtained crosslinked molded article after the electron beam irradiation has steam sterilization resistance. For example, even when a infusion tube which is the crosslinked molded article of the present invention is sterilized by steam at a temperature of 90 to 140° C. for about 10 to about 20 minutes, it does not happen to be transformed.

The term "steam sterilization resistance" as used herein means that, for example, when a resin molded article such as an infusion tube (for example, a tube having an internal diameter of 3 mm, an outer diameter of 4.4 mm, a wall thickness of 0.7 mm and a tube length of 20 cm) is placed in a high-pressure steam sterilizer and sterilized by steam at 121° C. for 20 minutes, the shape before sterilization is kept and no deformation is observed.

Further, the haze value of the resin molded article of the present invention irradiated with the electron beam is 50 or less, and preferably 30 or less. The haze value is the measure of transparency, and the transparency is improved with a decrease in this value. This haze value is a value measured in accordance with ASTM D-1003.

Furthermore, the toluene insoluble matter of the resin molded article of the present invention after the electron beam irradiation is usually from 50 to 99% by weight, and preferably from 80 to 95% by weight. The toluene insoluble matter is a barometer showing to what degree double bonds in (A) the syndiotactic 1,2-polypropylene have been crosslinked.

The toluene insoluble matter was determined herein by immersing the resin molded article of the present invention [(a) g] in 100 ml of toluene, conducting shaking at 30° C. for 48 hours, then, carrying out filtration using a 100-mesh wire mesh filter, collecting a part [(c) ml] of the filtrate, evaporating it to dryness, weighing the resulting residual solid matter [toluene soluble matter: (b) g], and calculating the gel content by the following equation:

$$\text{Gel content (\% by weight)} = [\{a - b \times (100/c)\}/a] \times 100$$

When the toluene insoluble matter is less than 50% by weight, crosslinking by the electron beam irradiation is insufficient, which causes poor heat resistance to result in poor steam sterilization resistance. On the other hand, when it exceeds 99% by weight, crosslinking by the electron beam irradiation proceeds too much. As a result, the molded article becomes too hard, unfavorably resulting in the loss of flexibility.

The above-mentioned toluene insoluble matter can be easily controlled by adjusting the above-mentioned product of electron beam acceleration voltage (kV) and irradiation dose (Mrad), preferably to 2 to 1,000,000 (kV·Mrad), more preferably to 25 to 300,000 (kV·Mrad) and still more preferably to 50 to 100,000 (kV·Mrad).

Further, the halogen atom content of the resin molded article of the present invention is 50 ppm or less, and preferably 20 ppm or less. The halogen atom content of the resulting 1,2-polybutadiene can be attained to 50 ppm or less, and preferably to 20 ppm or less, for example, by using the inert organic solvent of the non-halogen family as the polymerization solvent, as described above. Further, it is preferred that only non-halogen compounds are used in the catalyst system, because the halogen atom content of the resin molded article can be further reduced.

The resin molded article of the present invention is a syndiotactic 1,2-polybutadiene-containing molded article which is excellent in flexibility and hardness and has steam sterilization resistance, and useful for medical applications such as an infusion tube, an infusion solution, a catheter and the like.

EXAMPLES

The present invention will be illustrated in greater detail with reference to the following examples, but the invention should not be construed as being limited thereto. In the examples, parts and percentages are by weight, unless otherwise specified. Further, various measurements in the examples were made according to the following:

Steam Sterilization Resistance:
Described in the text.
Transparency (Haze Value):
Described in the text.
Tensile Strength, Tensile Breaking Elongation and Tensile Modulus:
Measured at a test speed of 200 mm/minute and at a distance between chucks of 50 mm in accordance with JIS K6301.
Gel Fraction:
Described in the text.
Hardness:
When the 50% stress of the molded article after the electron beam irradiation (50% M:M2) was 5 MPa or less, the hardness was not high, and it was taken as "good".
Flexibility:
When the tensile breaking elongation after the electron beam irradiation was 100% or more, it was taken as "good".

Example 1

A hundred parts by weight of 1,2-polybutadiene (manufactured by JSR Corporation, trade name: JSR RB810, crystallinity=18%) was molded into a tube having an internal diameter of 3 mm, an outer diameter of 4.4 mm and a wall thickness of 0.7 mm by extrusion molding, and this was subjected to electron beam irradiation treatment at an acceleration voltage of 300 kV at an irradiation dose of 20 Mrad using an electron beam irradiation apparatus (manufactured by Nisshin High Voltage Corporation, trade name: EPS800-35). The evaluation results are shown in Table 1.

Example 2

A tube was made and treated in the same manner as with Example 3 with the exception that a blend of 30 parts by weight of SIS (a styrene-isoprene-styrene block copolymer, manufactured by JSR Corporation, JSR SIS 5229P) and 1,2-polybutadiene was used. The evaluation results are shown in Table 1.

Example 3

A tube was made and treated in the same manner as with Example 2 with the exception that the irradiation dose of the electron beam was changed to 5 Mrad. The evaluation results are shown in Table 1.

Example 4

A tube was made and treated in the same manner as with Example 3 with the exception that a blend of 30 parts by weight of SIS (a styrene-isoprene-styrene block copolymer, manufactured by JSR Corporation, JSR SIS 5229P) and 1,2-polybutadiene was used. The evaluation results are shown in Table 1.

Comparative Example 1

In Example 1, the tube obtained by extrusion molding of 100 parts by weight of 1,2-polybutadiene was evaluated without application of electron beam irradiation. The evaluation results are shown in Table 1.

Comparative Example 2

A tube was made and treated in the same manner as with Example 1 with the exception that the acceleration voltage of the electron beam was changed to 30 kV and the irradiation dose was changed to 0.05 Mrad. The evaluation results are shown in Table 1.

Comparative Example 3

A tube was made and treated in the same manner as with Example 2 with the exception that the acceleration voltage of the electron beam was changed to 5,000 kV and the irradiation dose was changed to 300 Mrad. The evaluation results are shown in Table 1.

TABLE 1

|  |  |  | Example | | | | Comparative Example | | |
| --- | --- | --- | --- | --- | --- | --- | --- | --- | --- |
|  |  |  | 1 | 2 | 3 | 4 | 1 | 2 | 3 |
| Material | (*1) RB |  | 100 | 100 | 100 | 70 | 100 | 100 | 100 |
|  | (*2) SIS |  |  |  |  | 30 |  |  |  |
| Irradiation Conditions | (1) Acceleration Voltage | (kV) | 300 | 800 | 800 | 800 | No | 30 | 5,000 |
|  | (2) Irradiation Dose | (Mrad) | 20 | 20 | 5 | 5 | No | 0.05 | 300 |
|  | Product of (1) × (2) |  | 6,000 | 16,000 | 4,000 | 4,000 |  | 1.5 | 1,500,000 |
|  | Steam Sterilization Resistance | Shape Retention | ○ | ○ | ○ | ○ | X | X | ○ |
|  | Transparency | Haze | 15 | 14 | 16 | 20 | 18 | 17 | 9 |
|  | Tensile Strength | (MPa) | 12 | 16 | 20 | 22 | 14 | 15 | 14 |
|  | Tensile Breaking Elongation | (%) | 410 | 210 | 720 | 790 | 910 | 870 | 10 |
|  | Tensile 50% Stress before Irradiation (M1) | M1(MPa) | 3.4 | 3.4 | 3.4 | 3.2 | 3.4 | 3.4 | 3.4 |
|  | Tensile 50% Stress after Irradiation (M2) | M2(MPa) | 3.6 | 4.0 | 3.5 | 3.3 | — | 3.4 | 10.0 |

TABLE 1-continued

|  |  | Example | | | | Comparative Example | | |
| --- | --- | --- | --- | --- | --- | --- | --- | --- |
|  |  | 1 | 2 | 3 | 4 | 1 | 2 | 3 |
| M50 Ratio to before Irradiation M2/M1 | (—) | 1.06 | 1.18 | 1.03 | 1.03 | — | 1.00 | 2.94 |
| Gel Fraction | (%) | 57 | 99 | 91 | 87 | 0 | 30 | 100 |

(*1) RB; 1,2-Polybutadiene (manufactured by JSR Corporation, trade name: JSR RB810, crystallinity = 18%)
(*2) SIS; (A styrene-isoprene-styrene block copolymer, manufactured by JSR Corporation, JSR SIS 5229P)

As shown in Table 1, it is revealed that Example 1 in which the electron beam irradiation conditions of the present invention satisfy 2 to 1,000,000 (kV·Mrad) in the product of electron beam acceleration voltage (kV) and irradiation dose (Mrad) is improved in heat resistance (steam sterilization resistance) and excellent in flexibility, compared to Comparative Example 1 (no irradiation) and Comparative Example 2 (acceleration voltage: 30 kV, irradiation dose: 0.05 Mrad) not satisfying the irradiation conditions.

Further, it is revealed that Example 2 in which an acceleration voltage of 300 kV in Example 1 is increased to 800 kV is also improved in heat resistance (steam sterilization resistance).

Furthermore, Example 3, in which an irradiation dose of 20 Mrad in Example 1 was decreased to 5 Mrad, results in improved heat resistance (steam sterilization resistance) and further excellent flexibility.

Example 4, in which a blend of 30 parts by weight of SIS (a styrene-isoprene-styrene block copolymer, manufactured by JSR Corporation, JSR SIS 5229P) and 1,2-polybutadiene was used under the irradiation conditions in Example 3, results in excellent heat resistance (steam sterilization resistance) and flexibility.

On the other hand, in Comparative Example 1, the tube is not subjected to electron beam irradiation, and inferior in heat resistance (steam sterilization resistance).

In Comparative Example 2, the product of electron beam acceleration voltage (kV) and irradiation dose (Mrad) is below 2 to 1,000,000 (kV·Mrad) in the electron beam irradiation conditions, resulting in inferior heat resistance (steam sterilization resistance).

In Comparative Example 3, the product of electron beam acceleration voltage (kV) and irradiation dose (Mrad) exceeds 2 to 1,000,000 (kV·Mrad) in the electron beam irradiation conditions, resulting in inferior flexibility.

INDUSTRIAL APPLICABILITY

The resin molded article of the present invention is excellent in flexibility and hardness, and further has steam sterilization resistance, so that it is useful for applications such as a tube, a sheet, a film, a bag, a connector and the like. In particular, it is useful for medical applications such as an infusion tube, an infusion solution container, a catheter and the like.

Further, the processed product obtained by processing the resin molded article of the present invention by similar electron beam irradiation is useful for food applications, footwear applications, vehicle applications, wire covering applications or the like.

The invention claimed is:

1. An irradiated resin molded article for medical applications which is crosslinked by irradiating, with an electron beam, said resin molded article comprising 100 parts by weight of (A) syndiotactic 1,2-polybutadiene having a crystallinity of 5% or more, 0 parts by weight of (B) at least one thermoplastic polymer selected from the group of polypropylene, a styrene-butadiene-styrene block copolymer, a styrene-isoprene-styrene block copolymer, a hydrogenerated styrene-butadiene-styrene block copolymer, a hydrogenated styrene-isoprene-styrene block co-polymer, a polybutadiene other than the syndiotactic 1,2-polybutadiene, an acrylonitrile-butadiene-styrene resin, a polyisoprene, a polyethylene, an ethylene-vinyl acetate copolymer, an ethylene-acrylate ester copolymer and an ethylene-methacrylate copolymer, with the proviso that (A)+(B)=100 parts by weight, in which the irradiation dose of the electron beam is from 5 to 200 in Mrad, in which the energy of the electron beam is from 20 to 5,000 kV, wherein the tensile stress at the 50% point of the tensile strength curve of the irradiated resin molded article, as measured in MPa, is from 1.01 to 2.5 times the tensile stress at the 50% point of the tensile strength curve, as measured in MPa, of the resin molded article, and wherein the irradiated resin molded article has steam sterilization resistance.

2. The irradiated resin molded article according to claim 1, which has transparency that the haze value of a 2-mm sheet is 50 or less.

3. The irradiated resin molded article according to claim 2, which has a toluene insoluble matter after the electron beam irradiation of 50 to 99% by weight.

4. The irradiated resin molded article according to claim 3, wherein the shape of the molded article is at least one selected from the group of a tube, a sheet, a film, a bag and a connector.

5. The irradiated resin molded article according to claim 4, which is for medical applications.

6. The irradiated resin molded article according to claim 5, which has a halogen atom content of 50 ppm or less.

7. The irradiated resin molded article according to claim 1, which has a toluene insoluble matter after the electron beam irradiation of 50 to 99% by weight.

8. The irradiated resin molded article according to claim 1, wherein as for electron beam dose, the product of electron beam acceleration voltage in kV and irradiation dose in Mrad is from 2 to 1,000,000 kVMrad.

9. The irradiated resin molded article according to claim 8, which has transparency that the haze value of a 2-mm sheet is 50 or less.

10. The irradiated resin molded article according to claim 1, which has a halogen atom content of 50 ppm or less.

11. The irradiated resin molded article according to claim 1, wherein the shape of the molded article is at least one selected from the group of a tube, a sheet, a film, a bag and a connector.

12. The irradiated resin molded article according to claim 1, which has a halogen atom content of 50 ppm or less.

13. A processed product obtained by processing an irradiated resin molded article obtained by irradiating a resin molded article, with an electron beam, the resin molded article comprising 100 parts by weight of (A) syndiotactic 1,2-polybutadiene having a crystallinity of 5% or more, and 0 parts by weight of (B) at least one thermoplastic polymer selected from the group of polypropylene, a styrene-butadiene-styrene block copolymer, a styrene-isoprene-styrene block copolymer, a hydrogenerated styrene-butadiene-styrene block copolymer, a hydrogenated styrene-isoprene-styrene block copolymer, a polybutadiene other than the syndiotactic 1,2-polybutadiene, an acrylonitrile-butadiene-styrene resin, a polyisoprene, a polyethylene, an ethylene-vinyl acetate copolymer, an ethylene-acrylate ester copolymer and an ethylene-methacrylate copolymer, with the proviso that (A)+(B)=100 parts by weight in which the irradiation dose of the electron beam is from 5 to 200 in Mrad, wherein the tensile stress at the 50% point of the tensile strength curve of the irradiated molded article, as measured in MPa, is from 1.01 to 2.5 times the tensile stress at the 50% point of the tensile strength curve, as measured in MPa, of the resin molded article, and wherein the irradiated molded article has steam sterilization resistance.

* * * * *